US006747427B1

(12) United States Patent
Carson

(10) Patent No.: US 6,747,427 B1
(45) Date of Patent: Jun. 8, 2004

(54) MOTOR TORQUE CONTROL TO REDUCE POSSIBILITY OF CENTRIFUGE ROTOR ACCIDENTS

(75) Inventor: David Carson, Newtown, CT (US)

(73) Assignee: Kendro Laboratory Products, LP, Newtown, CT (US)

( * ) Notice: Subject to any disclaimer, the term of this patent is extended or adjusted under 35 U.S.C. 154(b) by 0 days.

(21) Appl. No.: 10/438,846

(22) Filed: May 16, 2003

(51) Int. Cl.[7] .................................................. H02P 7/00

(52) U.S. Cl. ....................... 318/432; 318/375; 318/434; 318/433

(58) Field of Search ................................. 318/432, 434, 318/433, 375, 376, 700, 800, 802, 803

(56) References Cited

U.S. PATENT DOCUMENTS 6,507,161 B2 * 1/2003 Fair ........................... 318/375
6,549,817 B1 * 4/2003 Audibert ...................... 700/50

* cited by examiner

*Primary Examiner*—Karen Masih
(74) *Attorney, Agent, or Firm*—Baker & Hostetler LLP

(57) ABSTRACT

Controlling the torque of a motor by driving a centrifuge rotor connected to the motor; increasing a motor torque of the motor to a specified level; detecting revolutions per minute of the centrifuge rotor; adjusting the motor torque based on detected revolutions per minute; decreasing the motor torque to a constant torque over a range of revolutions per minute; and increasing the motor torque when the detected revolutions per minute are outside of the range.

22 Claims, 4 Drawing Sheets

MOTOR TORQUE CONTROL TO REDUCE POSSIBILITY OF CENTRIFUGE ROTOR ACCIDENTS

FIELD OF THE INVENTION

The invention relates to the control of motors. More particularly, the present invention relates to the control of motor torque of a motor.

BACKGROUND OF THE INVENTION

In centrifuge systems, a motor is used to drive or rotate a centrifuge rotor. The centrifuge rotor top speed is limited by the torque that the motor can produce and the windage or drag torque produced as the centrifuige rotor rotates in air. In order to prevent or reduce the possibility of centrifuge rotor accidents, the drag or windage torque required to drive the centrifuge rotor equals the motor torque and the centrifuge rotor cannot be driven faster. The maximum kinetic energy of the centrifuge rotor is calculated at this point. Thus, the centrifuge containment system is then designed to properly contain a failure of the centrifuge rotor at this point of maximum kinetic energy.

Improving motor technology allows for increased motor torque which would allow the centrifuge rotor to be driven to a higher windage limited speed. At this higher windage limited speed the kinetic energy of the centrifuge rotor may exceed the proven energy containment limit of the centrifuge exposing the user to a dangerous situation. This could lead to centrifuge rotor failure and the possibility of centrifuge rotor accidents.

Accordingly, it is desirable to provide an invention that will avoid centrifuge rotor failure that would exceed the proven containment of the centrifuge.

SUMMARY OF THE INVENTION

The foregoing needs are met, to a great extent, by the present invention, wherein in one aspect an apparatus is provided that in one embodiment includes a control unit that adjusts the motor torque to equal the windage torque limit of a centrifuge rotor there by preventing the centrifuge rotor from being driven to a higher speed that would exceed the proven containment to the centrifuge.

In accordance with another embodiment of the invention, a method of controlling the torque of a motor includes the steps of driving a centrifuge rotor connected to the motor; increasing a motor torque of the motor to a specified level; and adjusting the motor torque to equal the windage torque of a centrifuge rotor and thereby limit the kinetic energy of said rotor.

The motor torque can be adjusted so that it does not exceed a specified windage torque limit and in some cases be decreased so that the lower motor torque results in a lower windage torque limit and thereby a lower kinetic energy.

The method can further include detecting revolutions per minute of the centrifuge rotor. The motor torque can be increased based on the detected revolutions per minute or otherwise adjusted. In some cases at a predetermined revolutions per minute the motor can be decreased to a constant torque over a range of detected revolutions per minute and then increased or further decreased.

In another embodiment of the invention, a system for controlling the torque of a motor includes a means for driving a centrifuge rotor connected to the motor; a means for increasing a motor torque of the motor to a specified level; and a means for adjusting the motor torque according to a predetermined windage torque limit of the centrifuge rotor or another predetermined torque range.

The means for adjusting the motor torque can adjust the motor torque so that it does not exceed a predetermined centrifuge rotor windage torque limit. In some cases the motor torque can be decreased so that the centrifuge rotor windage limit is lowered thereby decreasing the kinetic energy of the centrifuge rotor.

The system can also include a means for detecting revolutions per minute of the centrifuge rotor. The motor torque in some instances can be increased based on the detected revolutions per minute. In other embodiments the motor torque can be adjusted based on the detected revolutions per minute. For instance, in an alternate embodiment of the invention the motor torque can be decreased to a constant torque over a range of detected revolutions per minute and then increased or further decreased at subsequent higher revolutions per minute.

Another embodiment of the invention is a device that controls the torque of a motor, or a controller. The device includes a shaft connected to the motor. A centrifuge rotor is coupled to the shaft. The motor drives the shaft thereby moving the centrifuge rotor. A control unit, or controller, is in communication with the motor. The control unit increases a motor torque of the motor to a specified level, and adjusts the motor torque according to a predetermined torque curve.

The control unit can adjust the motor torque so that it does not exceed a predetermined windage torque limit of the selected centrifuge rotor. The control unit can also decrease the motor torque so that it limits a centrifuge rotor top speed to limit the maximum kinetic energy or the centrifuge rotor.

The control unit can adjust the motor torque to lower the motor torque over a specified speed range to prevent large centrifuge rotors, with high windage torque, from exceeding this speed range. Smaller centrifuge rotors with lower windage torque can be accelerated through this reduced motor torque speed range. Once past this rpm range of lowered motor torque, motor torque can then be increased to enhance the acceleration performance of the smaller centrifuge rotors.

A detector in communication with the control unit can also be provided. The detector can be used to determine revolutions per minute of the centrifuge rotor and decrease the motor torque based on revolutions per minute detected by said detector. In some instances the control unit can increase the motor torque based on revolutions per minute determined by the detector.

The control unit in one embodiment of the invention can determine revolutions per minute of the centrifuge rotor, and adjust the motor torque based on the detected revolutions per minute. The motor torque can in some cases be decreased to a constant torque over a range of detected revolutions per minute. Or can adjust the motor torque output to any type of mathematical curve such as a constant horsepower curve.

In an alternate embodiment of the invention, a method for controlling the torque of a motor includes the steps of driving a centrifuge rotor connected to the motor; increasing a motor torque of the motor to a specified level; detecting revolutions per minute of the centrifuge rotor; adjusting the motor torque based on detected revolutions per minute; decreasing the motor torque to a constant torque over a range of revolutions per minute; and increasing the motor torque when the detected revolutions per minute are outside of the range.

There has thus been outlined, rather broadly, certain embodiments of the invention in order that the detailed description thereof herein maybe better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, arc for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
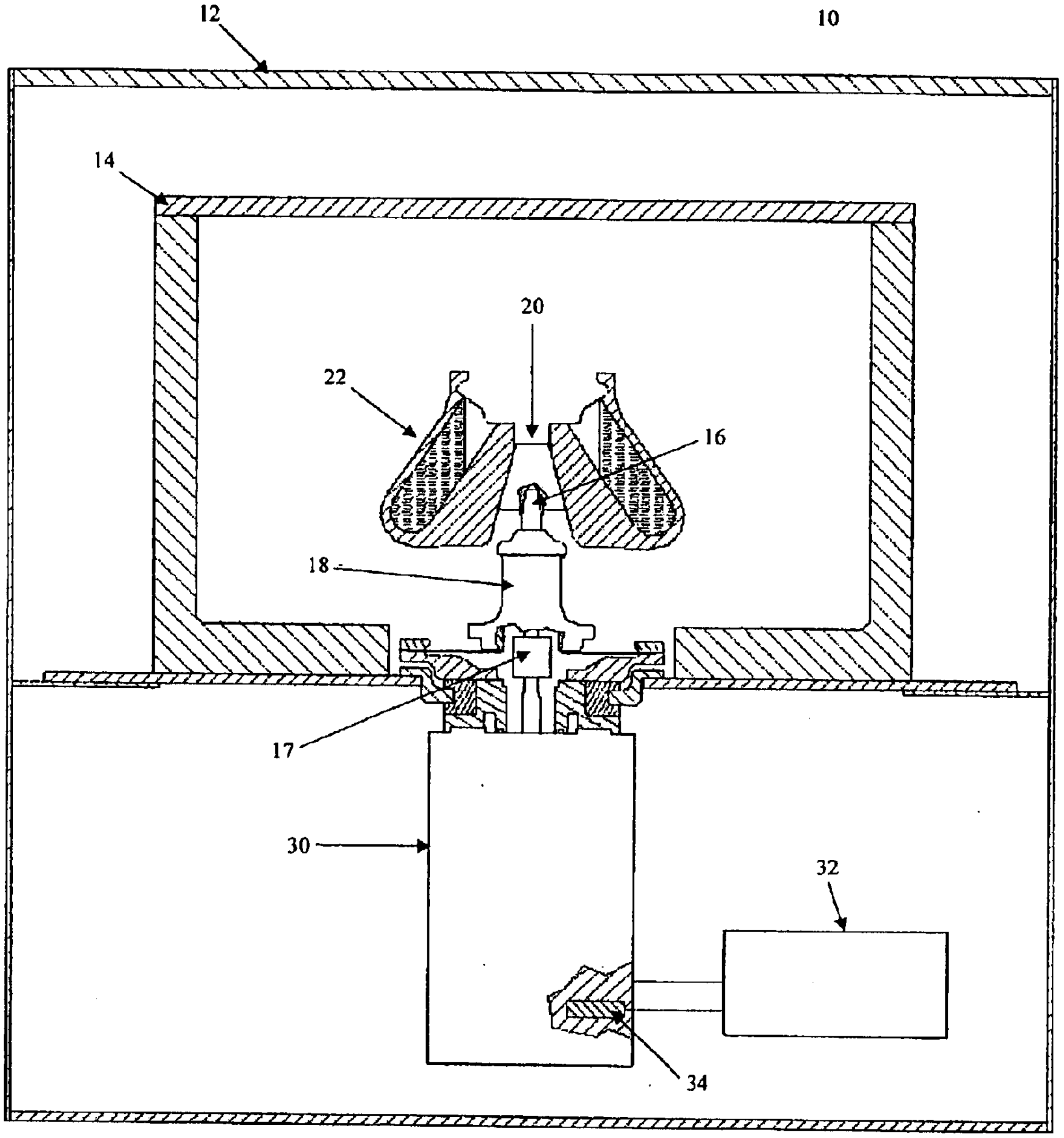
FIG. 1 is a illustration of a centrifuge.

The invention will now be described with reference to the drawing figures, in which like reference numerals refer to like parts throughout. An embodiment in accordance with the present invention provides a control unit that adjusts the motor torque according to a windage torque limit of a centrifuge rotor. By adjusting the motor torque so that the windage torque limit is not exceeded, the possibility of centrifuge rotor accidents is reduced.

An embodiment of the present invention is illustrated in FIG. 1. FIG. 1 is an illustration of a centrifuge 10. The centrifuge 10 has a casing 12 and a container 14 located within casing 12. The gyro, or drive shaft housing, 18 has a shaft 16 that extends through the casing and is coupled to the motor 30 through a coupling 17.

A drive cone or attachment 20 is located on top of shaft 16 where a centrifuge rotor 22 may be placed and secured. Centrifuge rotor 22 can be a detachable centrifuge rotor so that various sized centrifuge rotors may be interchangeably mounted on spud 20. The configuration of a centrifuge rotor can vary and be designed to generate frictional forces so that the drag or windage torque at any speed is known, commonly referred to as the windage torque curve.

Shaft 16 is supported by suitable bearings within centrifuge rotor gyro 18. The foregoing is only an example of one configuration of the driving mechanism that can be used to drive centrifuge rotor 22. Other mechanisms are known by those skilled in the art and can be used in the present invention.

A control unit 32 is in communication with motor 30. Control unit 32 is used to monitor and control the output of motor 30. For instance, control unit 32 can in one embodiment of the invention control the torque motor 30 generates in rotating centrifuge rotor 30. The control unit can be any type of digital or analog processor.

A detector 34 is in communication with control unit 32. Detector 34 can be used to determine the rotational speed or other characteristics of the centrifuge rotor and transmit this information to control unit 32. In one embodiment of the invention, the detector can be placed in a position to directly determine the revolutions per minute (RPM) centrifuge rotor 22 is rotating. This measurement in some embodiments of the invention may also be taken indirectly. Detector 34 may be placed in a position to take RPM measurements of the motor as shown, or of shaft 16. Detector 34 may also take other measurements that may be useful information to transmit to control unit 32, such as kinetic energy of the centrifuge rotor and the windage torque of the centrifuge rotor at any speed. This may be accomplished by measuring the acceleration and deceleration rates of the centrifuge rotor at low speeds or the use of other known methods. It is noted that more than one detector may be present to take a variety of measurements.

Detector 34 and motor 30 can be in communication with control unit 32 through hard wire connections or other wireless type connections such as infrared.

The operation of centrifuge 10 is as follows. Motor 30 is used to drive centrifuge rotor 22. Motor 30 applies torque through the coupling 17 to the gyro shaft 16. Bearings within the gyro 18 allow shaft 16 to rotate yet be supported by centrifuge rotor gyro 18. Centrifuge rotor 22 which is attached to spud 20 of shaft 16 is then rotated.

Detector 34 monitors characteristics, such as the revolutions per minute of shaft 16 and/or motor 30. Detector 34 then transmits these characteristics to control unit 32. Using information transmitted by detector 34, control unit 32 adjusts the torque motor 30 applies to the centrifuge rotor 22.

It will be assumed for the example given below that the centrifuge has a proven containment level of 150,000 ft-lbs of energy. Each centrifuge is designed and tested to safely contain an energy level appropriate for the use of the centrifuge.

Figure 2:
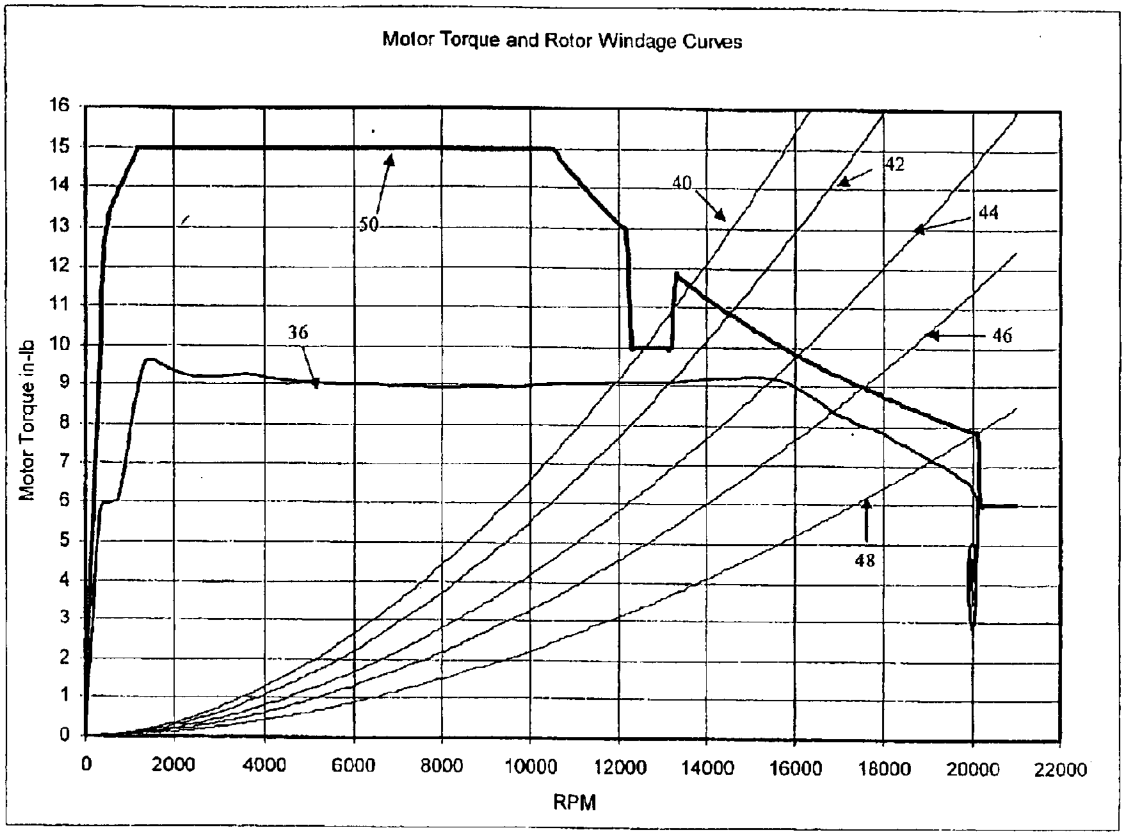
FIG. 2 is a graph plotting multiple motor torque and multiple centrifuge rotor windage curves.

FIG. 2 is an illustration of a graph plotting motor torque against RPMs. Curve 36 is a first motor characteristic curve showing the motor torque versus RPMs. The motor torque of the first motor increases to about 9.5 in-lbs and flattens out at about 9 in-lbs. When the RPMs reach about 15,500, the motor toque steadily decreases.

Curve 40 is a windage curve for a first centrifuge rotor. If the first centrifuge rotor is used with the first motor, the maximum RPMs would be about 11,800. This is the windage torque limit of the first centrifuge rotor with the first motor. At this speed the kinetic energy of this rotor will be 123,586 ft-lbs.

Curve 42 is a windage curve for a second centrifuge rotor. If the second centrifuge rotor is used with the first motor, the maximum RPMs would be about 13,000. This is the windage torque limit of the second centrifuge rotor centrifuge rotor with the first motor. At this speed the kinetic energy of this rotor will be 10,000 ft-lbs.

Curve 44 is a windage curve for a third centrifuge rotor. If the third centrifuge rotor is used with the first motor, the maximum RPMs would be about 15,300. This is the windage torque limit of the third centrifuge rotor centrifuge rotor with the first motor. At this speed the kinetic energy of this rotor will be 90,000 ft-lbs.

Curve 46 is a windage curve for a forth centrifuge rotor. If the forth centrifuge rotor is used with the first motor, the maximum RPMs would be about 16,800. This is the windage torque limit of the forth centrifuge rotor centrifuige rotor with the first motor. At this speed the kinetic energy of this rotor will be 70,000 ft-lbs.

Curve 48 is a windage curve for a fifth centrifuge rotor. If the fifth centrifuge rotor is used with the first motor, the maximum RPMs would be about 19,000. This is the windage torque limit of the fifth centrifuge rotor centrifuge rotor with the first motor At this speed the kinetic energy of this rotor will be 50,000 ft-lbs.

From the foregoing, the first motor characteristic curve is such that the windage curves 40, 42, 44, 46, and 48 set the maximum speed and therefore the maximum kinetic energy that these centrifuge rotors can achieve using motor 1.

As technology advances, motor technology produces higher torque motors, motor one and may be replaced by enhanced motors as shown by second motor characteristic curve 50, motor 2. As can be seen from FIG. 2, compared to first motor characteristic curve 36, second motor characteristic curve 50 increases the motor torque to a maximum torque of 15 in-lbs. This increase in torque is desirable to a centrifuge customer, it decreases the time required to accelerate the rotor to is operating speed. Therefore reducing the time required to perform the required separation.

The torque remains constant until about 10,500 RPMs. At this point the maximum horse power (hp) rating of 2.5 hp for the second motor is reached. This calculation can be made using the formula hp=torque (in-lbs)*RPMs/63025. In the present case, the toque at 10,500 RPMs is 15 in-lbs. Once the maximum hp rating is reached at 10,500 rpm the torque of the motor steadily decreases so that the 2.5 horsepower power input is constant.

Because second motor characteristic curve 50 has different characteristics than first motor characteristic curve 36, the windage torque limit for each of the centrifuge rotor curves will be increased and therefore the kinetic energy of each centrifuge rotor will increase. The kinetic energy will increase as the square of the speed. For example if the kinetic energy of a centrifuge rotor is 30,000 ft-lb at 17,000 rpm and the speed is increased to 20,000 rpm, its kinetic energy would be:

$$30{,}000*20{,}000^2/17{,}000^2=41{,}522 \text{ ft-lb}$$

Because of the increase in kinetic energy the centrifuge designer must be careful of not exceeding the proven containment level of the centrifuge. If the proven containment level is exceed an extensive redesign and test program will be required. The present invention provides a solution to this problem without giving up the customer advantage of increased acceleration from the higher motor torque. This will be further explained by continuing on with the above example.

If the second centrifuge rotor is used with the second motor, windage curve 42 indicates that the maximum RPMs will be about 14,500. At this speed the kinetic energy of this rotor will be 124,400 ft-lbs still below the proven containment energy level of 150,000 ft-lbs.

If the third centrifuge rotor is used with the second motor, windage curve 44 indicates that the maximum RPMs will be about 16,000. At this speed the kinetic energy of this rotor will be 98,423 ft-lbs still below the proven containment energy level of 150,000 ft-lbs.

If the forth centrifuige rotor is used with the second motor, windage curve 46 indicates that the maximum RPMs will be about 17,500. At this speed the kinetic energy of this rotor will be 75,954 ft-lbs still below the proven containment energy level of 150,000 ft-lbs.

If the fifth centrifuge rotor is used with the second motor, windage curve 48 indicates that the maximum RPMs will be about 20,000. At this speed the kinetic energy of this rotor will be 55,402 ft-lbs still below the proven containment energy level of 150,000 ft-lbs.

Figure 3:
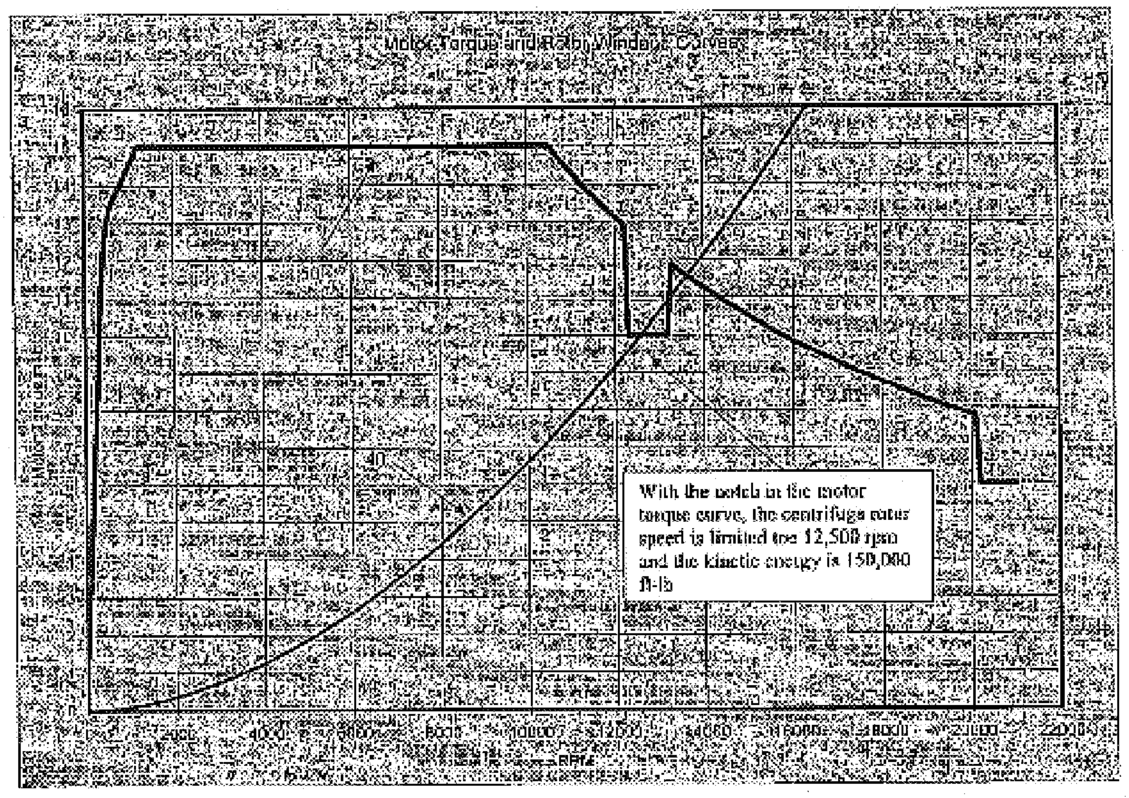
FIG. 3 is a graph plotting a single motor torque curve and a single centrifuge rotor windage curve.

If the first centrifuge rotor is used with the second motor, windage curve 40 indicates that the maximum RPMs will be about 13,700. FIG. 3 is an isolated view of second motor characteristic curve 50 and the second centrifuge rotor curve 40. As can be seen in this figure, if the notch portion of the curve is not present, the centrifuge rotor speed is limited to 13,700 rpm. At 13,700 rpm the kinetic energy of this rotor will be 166,598 ft-lbs., exceeding the proven containment level of the centrifuge in this example by 11%. The problem facing the centrifuge designer is how to have safe operation and still achieve optimal acceleration. In this case the torque is adjusted by making a notch in the second motor torque curve 50. This notch will decrease the torque output of the second motor to about 10 in-lbs reducing the RPMs from 12,200 rpm to 13,250 rpm. This notch limits the speed of the first centrifuge rotor to 12,600 rpm, and the kinetic energy to 140,911 ft-lbs below the 150,000 ft-lbs of proven containment energy. The notch in the torque curve only limits the maximum speed of the first centrifuge rotor. The first centrifuge rotor can not be run faster than the notch speed, when the windage torque equals the motor torque there is no additional torque for acceleration. The second, third, fourth and fifth centrifuge rotors are not limited by the notch because in the 12,200 rpm to 13,250 rpm speed range the windage torque of these rotors is below 10 in-lb. The acceleration performance of these centrifuge rotors is not significantly affected because of the narrow speed range of this notch.

Figure 4:
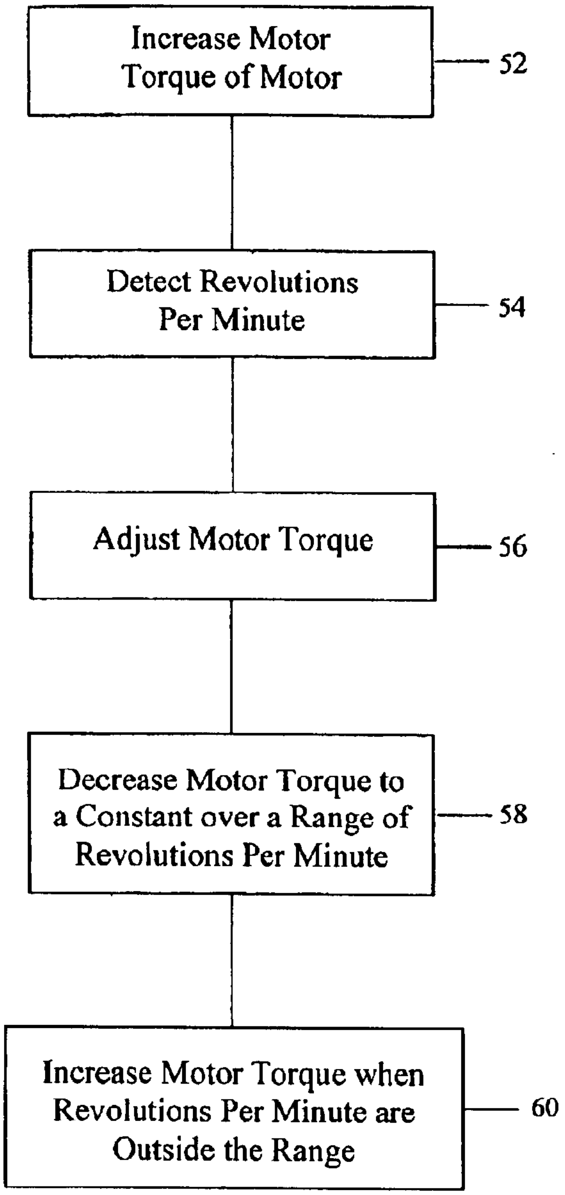
FIG. 4 is a flowchart illustrating steps of the present invention.

FIG. 4 is a flow chart showing the method steps of the present invention. In step 52 the motor torque of motor 30 is increased to a specified level. As illustrated in FIG. 3 the motor torque of the second motor is increased to a motor torque of 15 in-lbs.

In step 54 detector 34 monitors the revolutions per minute of centrifuge rotor 22 and transmits this information to control unit 32. When the revolutions per minute reach a set range, in this case 12,200 to 13,250 rpm, control unit 32 sends a signal to motor 30 to adjust the motor torque of the motor (step 56).

In step 58 the motor torque is decreased to a constant over a range of revolutions per minute. In the present case it is reduce to 10 in-lbs over a range of approximately 12,200 revolutions per minute to 13,250 revolutions per minute. This creates a notch-like feature as illustrated in FIG. 3 limiting the speed of first centrifuge rotor to 12,600 rpm, which translates to a kinetic energy of 140,911 ft-lbs. This will prevent the centrifuge rotor from exceeding the proven centrifuige containment limit. Thus, the possibility of a centrifuge rotor accident exceeding the proven containment limit of the centrifuge will be eliminated.

In step 60, once the detector 34 detects that the RPMs have exceeded 13,250, the motor torque is increased to approximately 11.9 in-lbs and then to follow the characteristic curve of the second motor characteristic curve 50.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents maybe resorted to, falling within the scope of the invention.

What is claimed is:

1. A method of controlling the torque of a motor comprising the steps of:

driving a centrifuge rotor connected to the motor;

increasing a motor torque of the motor to a specified level; and adjusting the motor torque according to a windage torque limit of the centrifuge rotor to limit the kinetic energy of the centrifuge rotor.

2. The method as recited in claim 1, wherein the motor torque is adjusted so that it equals the windage torque of a centrifuge rotor at a speed, or kinetic energy level, that does not cause the proven containment limit of the centrifuge to be exceeded.

3. The method as recited in claim 1, wherein the motor torque is decreased to equal the windage torque of a centrifuge rotor at a speed, or kinetic energy level, that does not cause the proven containment limit of the centrifuge to be exceeded.

4. The method as recited in claim 3, further comprising the step of detecting revolutions per minute of the centrifuge rotor.

5. The method as recited in claim 4, further comprising the step of increasing the motor torque based on the detected revolutions per minute.

6. The method as recited in claim 1, wherein the step of adjusting the motor torque further comprises the steps of:

detecting revolutions per minute of the centrifuge rotor; and adjusting the motor torque based on the detected revolutions per minute.

7. The method as recited in claim 6, wherein the motor torque is decreased to a constant torque over a range of detected revolutions per minute.

8. A system for controlling the torque of a motor comprising:

means for driving a centrifuge rotor connected to the motor;

means for increasing a motor torque of the motor to a specified level; and means for adjusting the motor torque to equal the windage torque limit of a centrifuge rotor at a speed , or kinetic energy level, that does not cause the proven containment limit of the centrifuge to be exceeded.

9. The system as recited in claim 8, wherein said means for adjusting the motor torque adjusts the motor torque so that it does not exceed the a predetermined torque curve or setting.

10. The system as recited in claim 8 wherein said means for adjusting the motor torque decreases the motor to equal the windage torque limit of a centrifuge rotor at a speed, or kinetic energy level, that does not cause the proven containment limit of the centrifuge to be exceeded.

11. The system as recited in claim 10, further comprising means for detecting revolutions per minute of the centrifuge rotor.

12. The system as recited in claim 11, further comprising means for increasing the motor torque based on the detected revolutions per minute.

13. The system as recited in claim 8, wherein said means for adjusting the motor torque further comprises:

means for detecting revolutions per minute of the centrifuge rotor; and means for adjusting the motor torque based on the detected revolutions per minute.

14. The system as recited in claim 13, wherein the motor torque is decreased to a constant torque over a range of detected revolutions per minute.

15. A device that controls the torque of a motor comprising:

a shaft connected to the motor;

a centrifuge rotor coupled to said shaft, the motor driving said shaft thereby moving said centrifuge rotor;

a control unit in communication with the motor, said control unit increasing a motor torque of the motor to a specified level, and adjusting the motor torque to equal the windage torque limit of a centrifuge rotor at a speed that does not cause the proven containment limit of the centrifuge to be exceeded.

16. The device as recited in claim 15, wherein said control unit adjusts the motor torque to equal the windage torque limit of a centrifuge rotor at a speed, or kinetic energy level, that does not cause the proven containment limit of the centrifuge to be exceeded.

17. The device as recited in claim 15, wherein said control unit decreases the motor torque to equal the windage torque limit of a centrifuge rotor at a speed, or kinetic energy level, that does not cause the proven containment limit of the centrifuge to be exceeded.

18. The device as recited in claim 15, further comprising a detector in communication with said control unit, said detector determining revolutions per minute of the centrifuge rotor and said control unit decreasing the motor torque based on revolutions per minute detected by said detector.

19. The device as recited in claim 18, wherein said control unit increases the motor torque based on revolutions per minute determined by said detector.

20. The device as recited in claim 15, wherein in said control unit determines revolutions per minute of the centrifuge rotor, and adjusts the motor torque based on the detected revolutions per minute.

21. The device as recited in claim 20, wherein the motor torque is decreased to a constant torque over a range of detected revolutions per minute.

22. A method for controlling the torque of a motor comprising the steps of:

driving a centrifuge rotor connected to the motor;

increasing a motor torque of the motor to a specified level;

detecting revolutions per minute of the centrifuge rotor;

adjusting the motor torque based on detected revolutions per minute;

decreasing the motor torque to a constant torque over a range of revolutions per minute; and increasing the motor torque when the detected revolutions per minute are outside of the range.

* * * * *